United States Patent

Krauss et al.

[11] Patent Number: 6,067,087
[45] Date of Patent: May 23, 2000

[54] METHOD FOR BUILDING MENUS DURING IDLE TIMES

[75] Inventors: Jeffrey Thomas Krauss, Bellevue; Ravindra Kumar Agrawal, Redmond, both of Wash.

[73] Assignee: Microsoft Corporation, Redmond, Wash.

[21] Appl. No.: 09/033,922

[22] Filed: Mar. 3, 1998

[51] Int. Cl.[7] .............................. G06F 3/14; G06F 13/372
[52] U.S. Cl. ........................... 345/352; 345/353; 712/245
[58] Field of Search ............................ 707/7, 102; 710/3, 710/5; 711/134; 712/1, 245; 345/333, 352, 353, 302, 339

[56] References Cited

U.S. PATENT DOCUMENTS

| | | | |
|---|---|---|---|
| 5,208,910 | 5/1993 | Higgins et al. | 345/352 |
| 5,625,783 | 4/1997 | Ezekiel et al. | 345/352 |
| 5,668,959 | 9/1997 | Malcolm | 345/333 |
| 5,671,385 | 9/1997 | Jost | 711/114 |
| 5,721,922 | 2/1998 | Dingwall | 345/302 |
| 5,734,861 | 3/1998 | Cohn et al. | 711/134 |
| 5,745,785 | 4/1998 | Shoji et al. | 710/7 |
| 5,752,066 | 5/1998 | Bealkowski et al. | 712/1 |
| 5,801,701 | 9/1998 | Koppolu et al. | 345/352 |
| 6,012,052 | 1/2000 | Altscholer et al. | 707/102 |

*Primary Examiner*—Raymond J. Bayerl
*Assistant Examiner*—Chadwick A Jackson
*Attorney, Agent, or Firm*—Jones & Askew, LLP

[57] ABSTRACT

A Menu Building Component (MBC) builds menus during a computer's idle time. The MBC builds a menu for each menu title on a Menu Bar and stores each built menu in the computer's random access memory (RAM). The MBC requests an allocation of idle time by registering with a Component Manager. The Component Manager notifies the MBC of the availability of idle time by sending a notification signal to the MBC. When the MBC receives the notification signal, the MBC builds the next unbuilt menu corresponding to a menu title on the Menu Bar. When the last menu has been built, the MBC unregisters with the component manager. If a user makes a menu demand for an unbuilt menu, the MBC will build the demanded menu on demand, rather than during an idle time. If the user makes a menu demand for a built menu, the built menu is recalled from RAM and displayed for use by the user. Because the MBC builds menus during idle times, start-up delays and menu demand delays are minimized. By storing the built menus in RAM, the MBC can display menus instantaneously upon demand, with little or no delay perceivable to the user.

25 Claims, 7 Drawing Sheets

1

METHOD FOR BUILDING MENUS DURING IDLE TIMES

TECHNICAL FIELD

The present invention relates to a method for building menus, and more particularly relates to an improved method for building menus during an application program's idle time.

BACKGROUND OF THE INVENTION

Computer users have become accustomed to the use of drop-down menus as a means for issuing commands to a computer. This method of issuing commands became commonplace with the advent of the graphical user interface (GUI), in which most commands could be displayed on a video monitor and selected using a mouse. The predecessor to the GUI was the command-line interface, in which the user issued a command to the computer by typing the command on a command-line and submitting the complete command to the computer (usually by pressing the ENTER key). GUIs were developed to make using a computer easier for less-technical users, by simplifying the process of generating and submitting commands to the computer.

One innovation of the GUI was to place most of an application program's available functions within the view of the user. Typically, symbols representing the commands are displayed on the computer's monitor in the form of text, buttons, or icons. By the use of a mouse or other pointing device, the computer user merely points to the command symbols for a desired command and selects the command. In response to this selection, the computer executes the function or operation associated with the command. Thus, the user need not memorize commands or refer to an operation manual in order to execute desired operations.

Menus provide a means of organizing command symbols such that large numbers of commands can be displayed on demand. By grouping commands within a menu, any number of commands can be displayed when the user selects a menu from a list of available menus. The list of available menus can be altered to accommodate the commands that are available in a given context. For example, where the user is using a spreadsheet application program, the list of menus may include only those menus pertaining to the "active" spreadsheet application program and may not include menus that contain commands pertaining to an "inactive" word processing application program. Similarly, where the user is utilizing the calculation capabilities of the spreadsheet application program, a different set of menus can be made available than when the user is utilizing the graphing capabilities of the same spreadsheet application program.

Most GUIs provide the list of available menus in the form of a Menu Bar across the top of the viewable area of the computer's monitor and/or across the top of the viewable area of a particular application frame. Although the contents of the Menu Bar (menu titles) may change in response to a change in available menus, the Menu Bar is typically always visible when the GUI is operative. To view the contents of a particular menu, the user selects the menu title from the Menu Bar, and the menu associated with the menu title is displayed. Because the menu typically descends from the Menu Bar, such menus are commonly called "drop-down" menus. A menu's contents are referred to as menu items. Menu items include the command symbols as well as other elements such as dividing lines for partitioning the command symbols into sets. The desired command is executed when the user selects the corresponding command symbol (i.e., menu item) from the menu.

A menu structure consists of a Menu Bar, at least one menu title, and any number of menu items. The menu structure can be defined in one or more menu data files that contain information pertaining to the menu titles in the Menu Bar, the menu items in the menu, and the characteristics of each menu item. By calling certain routines, an application program can direct the computer's operating system to build the menu structure according to the specifications stored in the menu data files. Building menus is the process of assembling the constituent parts and making the menu available for access by the user.

Most application programs perform menu building in the background. That is, the menu building process is hidden from the user. After building the menus required by a particular application program, the complete structure of the menus can be placed in the computer's random access memory (RAM) and accessed instantly, so that the menus are available to the user on demand. The user sees only the completed menu when the user selects a menu title from the Menu Bar. Depending on when the menu is built, the user may perceive a delay between the time that the user selects a menu and the time that the menu is displayed. Most application programs build menus upon startup (boot) or upon user demand.

The advantage of building an application program's menus at boot is that the menu structure will have been completely built when the user demands the menu. The user of an application program that builds menus at boot will not normally be able to perceive a delay between when the user selects the menu title and when the menu is displayed. This is because the menu will have been built in advance and will have been stored in RAM for essentially immediate display. Unfortunately, this method increases the boot time for the application program, because the application program is not usable by the user until the entire menu structure has been built and stored in RAM. Where the required boot time must be minimized, this method is not appropriate. Moreover, this method is inefficient in that every menu is built at boot and the user must wait for the building of a menu that may never be used.

Another commonly used method of menu building is to build menus on demand. That is, a menu is built and stored in RAM, only after the user selects the menu title for the first time following boot. One advantage to this method is that an unused menu is never built, and the application program is, therefore, more efficient than an application program that builds all of the menus. Unfortunately, this method will usually expose the user to a perceivable delay on the first time that each different menu is selected (a "first-time" delay). Because a menu that is selected by the user for the first time must be built at that time, the user must wait for the application program to build, store, and display the menu.

Therefore, there is a need in the art for an improved method of building menus such that an application program may build its entire menu structure without lengthening the application program's boot time. This method should build menus so that there are no first-time delays or so that first-time delays are minimized.

SUMMARY OF THE INVENTION

The present invention satisfies the above-described needs by providing an improved method for building menus during times that an application program is idle. In one aspect, the present invention utilizes a Component Manager to determine when the application program is idle. During idle times, the menu structure is built, one menu at a time, until every menu in the structure has been built. By utilizing idle times, the present invention eliminates the boot delay associated with application programs that build menus at boot. First-time delays are also minimized. A user will, however, experience a first-time delay when the user selects a menu that has not yet been built during idle time, because the menu will have to be built before the menu can be displayed for use by the user. However, in another aspect of the invention, the menu building process is interrupted to build, store, and display the demanded menu, so as to minimize the first time delay.

Depending on the operating environment in which the present invention is implemented, the present invention may be implemented as a Menu Building Component, which is responsive to idle time notifications generated by a Component Manager. Alternatively, the present invention may be implemented as a program module that stands alone or is integrated into an application program. The method builds predetermined aspects of the menu structure during idle times. Thus, the menu building process, as performed by the improved method of the present invention, minimizes the use of computer resources during times that these resources are being demanded by other components and/or application programs.

The various aspects of the present invention may be more clearly understood and appreciated from a review of the following detailed description of the disclosed embodiments and by reference to the appended drawings.

DETAILED DESCRIPTION

Figure 1:
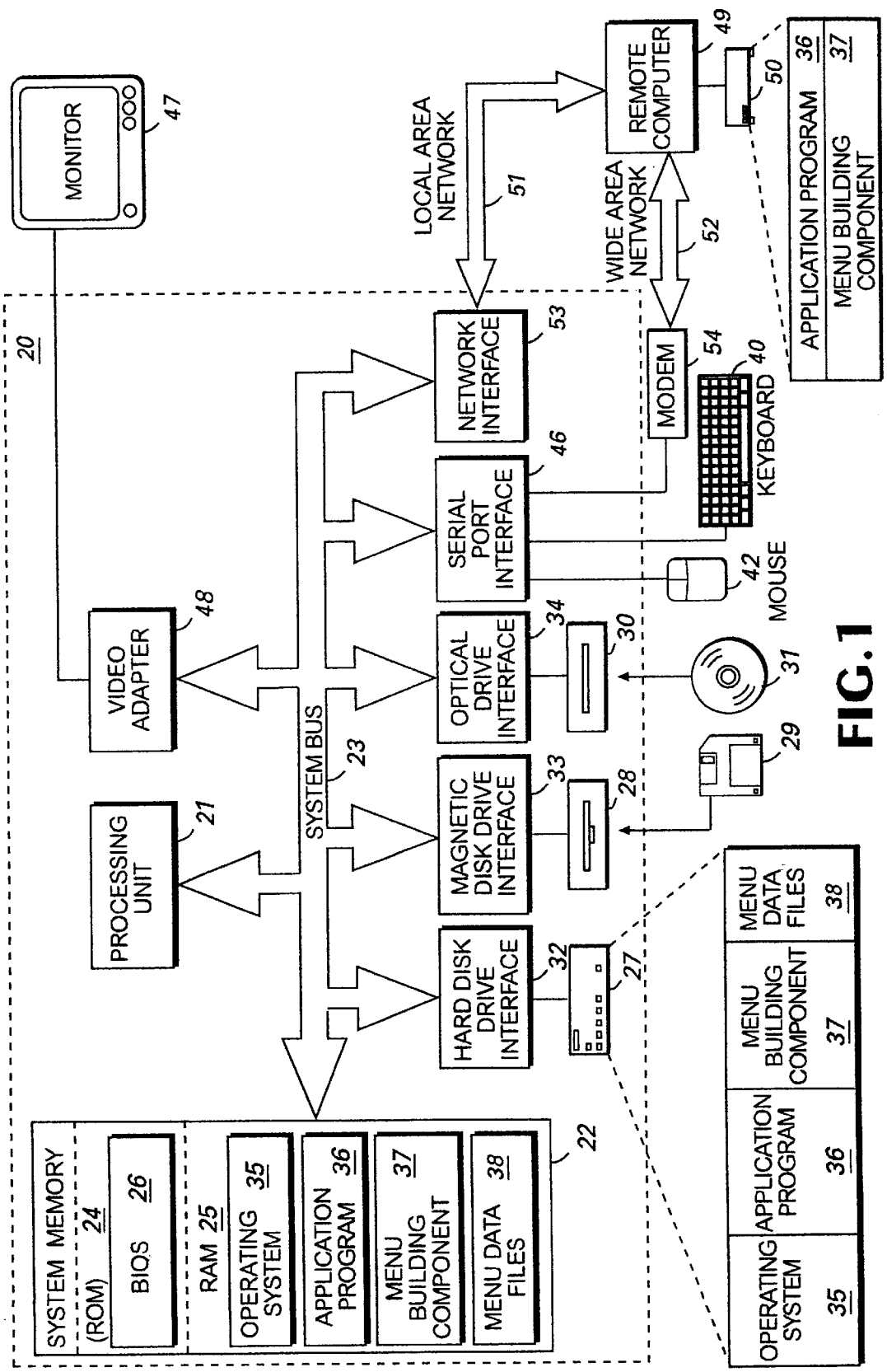
FIG. 1 is a block diagram of a personal computer that provides the operating environment for an embodiment of the present invention.

The present invention is directed to a method for building menus during an application program's idle times. In an exemplary embodiment, the present invention determines that the application program associated with a particular menu structure is in an idle state. The present invention builds sections of the menus of the menu structure while the application program is in the idle state. By building certain menu structure components during certain blocks of idle time, an exemplary embodiment of the present invention reduces the delays associated with menu building.

A Component Manager allocates idle time to various registered components, including a Menu Building Component (MBC), by transmitting an idle time notification to the components, one component at a time. The MBC registers an idle time request with the Component Manager, when the application program's menu structure contains unbuilt menus. When the MBC receives an idle time notification from the Component Manager, the MBC builds the menu corresponding to the next menu title in a queue, for which a menu has not been built. After all of the menus have been built for all of the menu titles in the queue, the MBC unregisters with the Component Manager, so that the Component Manager allocates no more time to the MBC.

This menu building process is altered in the instance where a user selects a menu title, from the application program's Menu Bar, for which a menu has not been built. In this case, the present invention causes the menu to be built immediately, so that the menu can be displayed on the monitor for immediate use. The menu title to which the built menu corresponds is thus removed from the queue, so that the MBC does not attempt to build a corresponding menu during a subsequent idle time.

Referring now to the drawings, in which like numerals represent like elements throughout the several figures, aspects of the present invention and an exemplary operating environment will be described.

AN EXEMPLARY OPERATING ENVIRONMENT

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a Menu Building Component 37, and one or more menu data files 38. As is depicted in FIG. 1, the hard drive 27 and other drives (such as the optical disk drive 30) may provide a nonvolatile storage for these program modules. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The memory storage device may contain program modules similar to that stored on the personal computer's drives and RAM, such as the application program 36 and MBC 37, depicted in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

THE COMPONENT MANAGER

An exemplary embodiment of the present invention operates in conjunction with a program module known as the Component Manager. A brief description of the Component Manager follows to provide a better foundation for understanding the operation of an exemplary embodiment of the present invention, which will be described in more detail below.

Application programs, such as word processing programs, spreadsheet programs, and multimedia programs, typically employ a number of components that function in many respects as independent entities. Each component is typically configured as a separate module or object in an object-oriented operating environment. Although a component is an independent module, it defines an interface—a standardized communication syntax—for communicating with it. In this manner, virtually all of the functionality of the application program may be implemented through a set of cooperating components. For example, a word processing program may include a separate component for each document that the user has opened, as well as separate components for the tool bar, each item in the tool bar, each pull-down window that can be activated from the tool bar, each individualized user interface that can be activated from the tool bar, etc.

Figure 2:
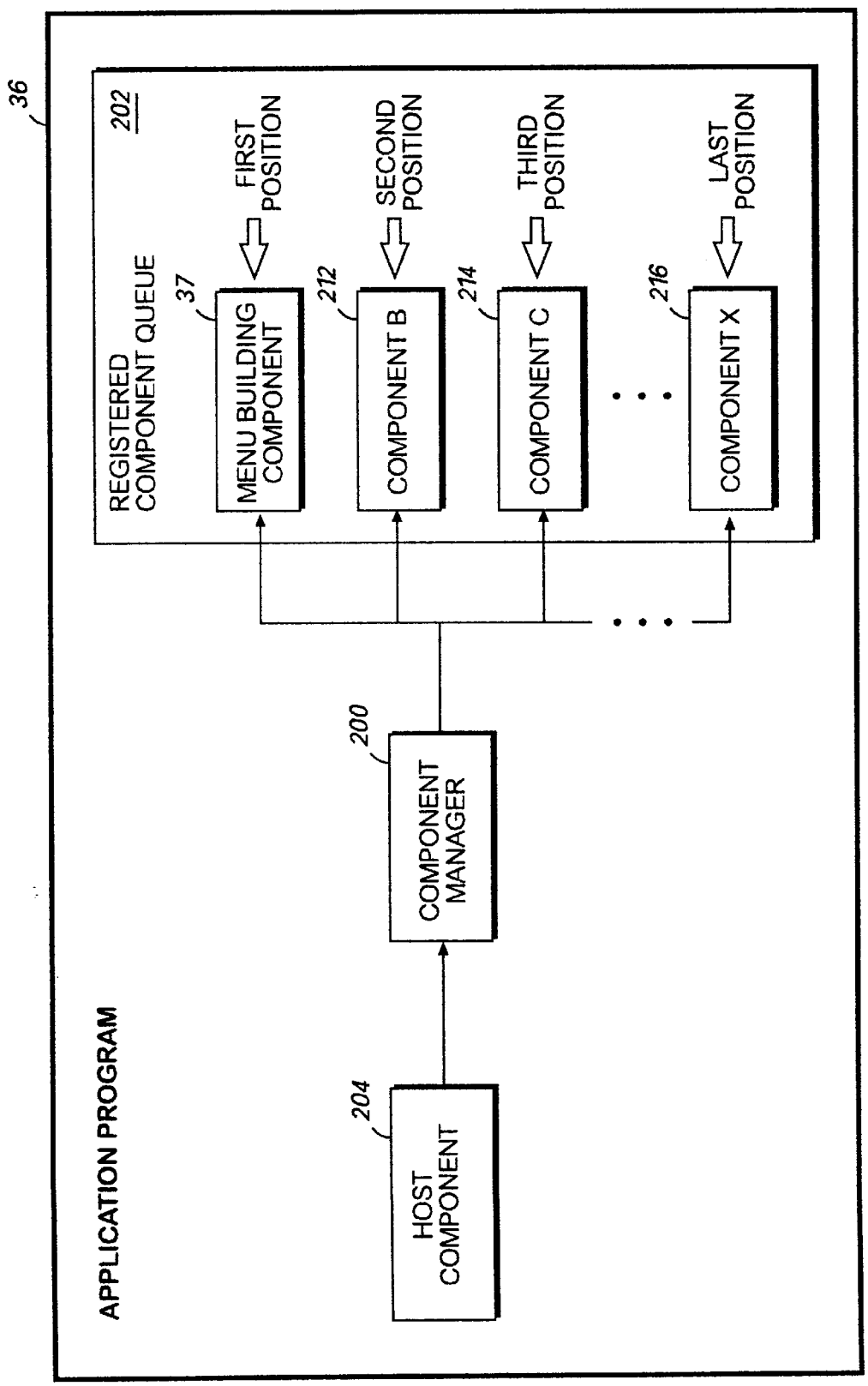
FIG. 2 is a block diagram illustrating the major program modules involved in idle time management that is performed by the Component Manager in an embodiment of the present invention.

Referring now to FIG. 2, the Component Manager 200 provides a means of integrating the components of an application program 36 so that all of the components operate properly in conjunction with one another. One area in which integration is needed is in the area of management of idle time allocation among the components. Idle time is determined by the activity or inactivity of the application program 36. When the application program 36 is not making any demands on the operating system, the Component Manager 200 detects an idle time. Many components reserve some or all of their operations for execution during idle times. The Component Manager 200 provides a centralized means of allocating the idle time such that the individual components do not attempt to become active at the same time.

The Component Manager 200 is a program module that can be implemented as part of an application program 36. In the context of the present invention, the primary function of the Component Manager 200 is to allocate idle time to registered components indexed in a Registered Component Queue 202. When one of the registered components in the Registered Component Queue 202 receives an idle time notification from the Component Manager 200, the registered component executes an operation that the component has reserved for execution during an idle time. Notably, FIG. 2 depicts a Menu Building Component (MBC) 37 in the Registered Component Queue 202 that is implemented as part of the application program 36, rather than as an individual program module as it is depicted in FIG. 1.

The primary functions of the application program 36 are performed by a section of the application program 36 code known as the Host Component 204. Thus, from the perspective of the Component Manager 200, the universe is made up of components that request idle time (registered components 37, 212, 214, 216), and components that produce idle time (Host Component 204). Components that require idle time can request an idle time allocation by registering with the Component Manager 200, which will place each registering component in a Registered Component Queue 202 so that each component receives an idle time allocation in some predefined order (e.g., first-come-first-served). When the Host Component 204 becomes inactive, the Component Manager 200 detects the inactivity and sends an idle time notification signal to the registered component in the first position 210 of the Registered Component Queue 202. After the notification signal is sent to the first component, in this case, the MBC 37, the MBC 37 is moved to the last position of the Registered Component Queue 202, below Component X 216, formerly in the last position.

Those skilled in the computer arts will appreciate that the Registered Component Queue 202 need not be maintained such that the constituent components are literally moved (e.g., from the first position to the last position). Indeed, any method providing a means by which the Component Manager 200 can traverse the components in the Registered Component Queue 202 in a predefined order is suitable for the purposes of an exemplary embodiment of the present invention. One such method is enabled by the use of a pointer to indicate which component is currently being allocated idle time and which component is next to be allocated idle time. The Component Manager 200 may utilize a list that maintains pointers to all components, with a flag indicating which components have requested an idle time allocation. Such an implementation of the Component Manager 200 would negate the need for positions. Although the MBC 37 is depicted in FIG. 2 in a "first position", it may be placed in any position within the Registered Component Queue 202 or be maintained, as described, without reference to a particular position.

The Component Manager 200 does not literally allocate idle time, to the extent that the Component Manager 200 does not limit the amount of time that the registered components can consume, once the idle time notification is sent. The registered components can take as much time as is necessary to complete the task that the component has undertaken during idle time. However, a task that requires a great deal of time can delay the ability of the Host Component 204 to become active again.

If a component is still executing its idle time task when the Host Component 204 becomes active, the Host Component 204 may be delayed such that the user can perceive the delay. This consequence defeats one of the principal purposes behind idle time management because the component is consuming computer resources during a non-idle time. To avoid this consequence, the components must be individually programmed to be "good citizens." That is, each component should be programmed to perform only very small operations upon receipt of an idle time notification. Thus, when the Host Component 204 becomes active again, the component will be finished or nearly finished with its idle time operations.

Figure 3:
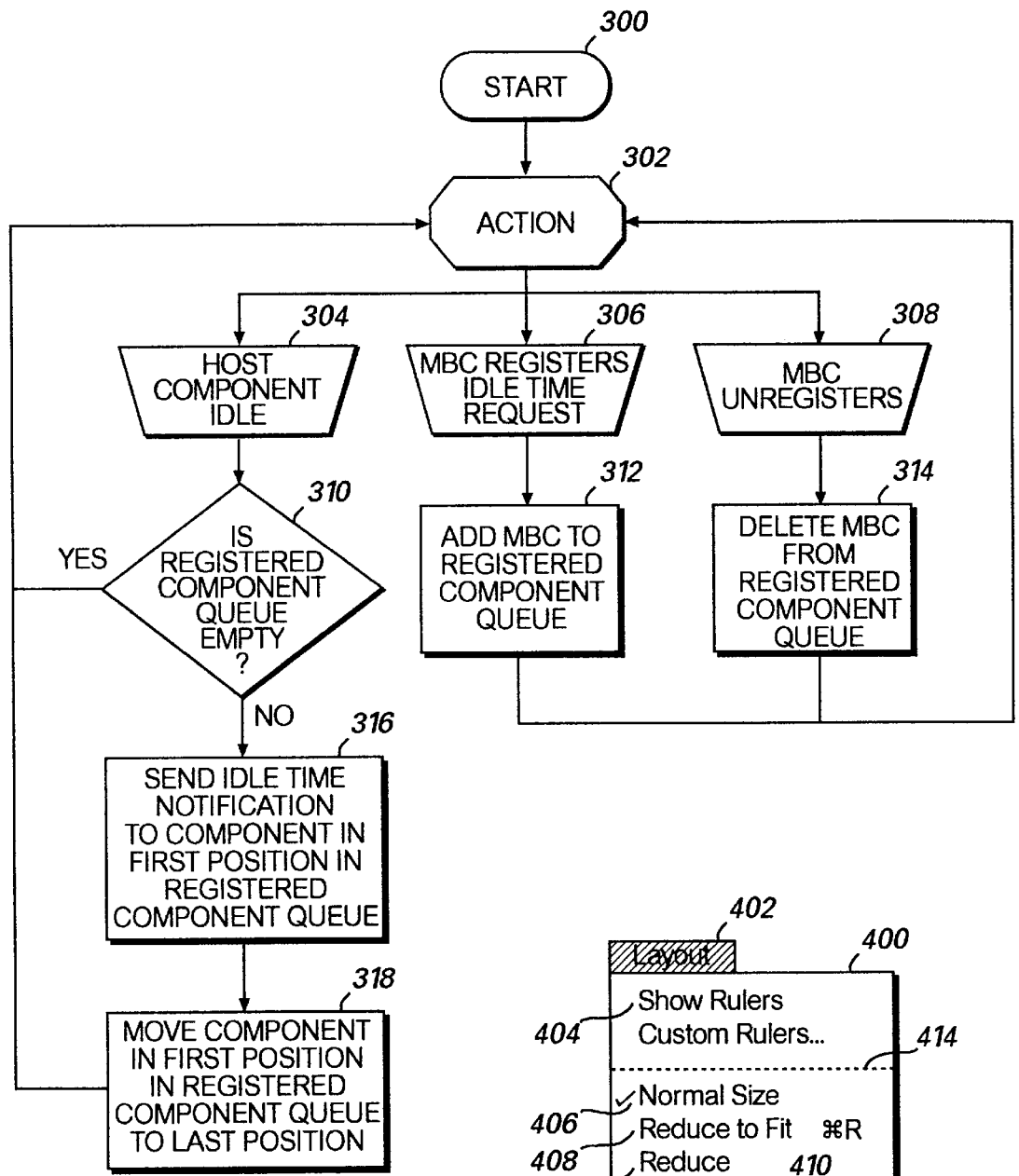
FIG. 3 is a flowchart illustrating the method of operation of the Component Manager in an embodiment of the present invention.

Referring now to FIG. 3, the method of operation of an exemplary Component Manager 200 (FIG. 2) is depicted. For the purposes of this discussion, the MBC 37 is used as an exemplary component. However, FIG. 3 depicts the operation of an exemplary Component Manager 200, regardless of the affected component.

The method begins at the START block 300 and then branches to the ACTION Block 302. The ACTION block 302 represents the Component Manager's 200 responsiveness to separate potential events. If the MBC 37 registers an idle time request with the Component Manager 200 (FIG. 2), the method branches to event block 306. The method adds the MBC 37 to the Registered Component Queue 202 (FIG. 2) by branching to step 312. The method then branches back to the ACTION block at step 302. If the MBC 37 unregisters with the Component Manager 200 (FIG. 2), the method branches to event block 308. The method deletes the MBC 37 from the Registered Component Queue 202 (FIG. 2) by branching to step 314. The method then branches back to the ACTION block at step 302.

When the Host Component 204 becomes idle, the method branches to event block 304. The method then branches to decision block 310, at which a determination is made as to whether the Registered Component Queue 202 is empty. If the Registered Component Queue 202 is not empty (i.e., there are components who are registered to receive an idle time notification), then the method branches to step 316 and sends an idle time notification to the component in the first position of in the Registered Component Queue 202 (in this example, the MBC 37). The method then branches to step 318 and moves the registered component in the first position of the Registered Component Queue 202 to the last position. Once step 318 is completed, the method branches back to the ACTION block 302.

As discussed above in connection with FIG. 2, the registered components need not be literally moved for the Registered Component Queue 202 to be traversed. Other methods, such as a pointer arrangement can be utilized to indicate which registered component will be allocated idle time next.

Returning to the decision block 310, a determination that the Registered Component Queue 202 is empty (i.e., there are no components registered to receive idle time notifications) causes the method to branch back to the ACTION block 302.

As will be discussed in more detail below, menu building may be accomplished by means of the MBC 37. The MBC 37 may interact with the Component Manager, just as any other registered component in the Registered Component Queue 202, as described above. By use of the means provided by the present invention, the MBC 37 can interact with the Component Manager 200 so that the majority of the time required for building menus is consumed while the Host Component 204 is idle.

Although the operation of the Component Manager has been described as part of an application program, those skilled in the art will recognize that a Component Manager could be utilized as a stand-alone program module and could be utilized to manage the operation of components that are either part of an application program or stand-alone modules themselves. Those skilled in the art will also recognize that idle time management can be performed in different ways, and the Component Manager is but one way to allocate idle time among program modules.

MENUS AND MENU BUILDING FUNDAMENTALS

In a graphical user interface (GUI) environment, menus are the primary means for a user to issue commands to the application program 36 (FIG. 1). Many GUIs employ a Menu Bar across the top-most portion of the monitor and/or the top of an application frame. The Menu Bar typically contains a horizontal list of menu titles representing available menus. When the user points a user interface selection device, such as a mouse, to a menu title, the menu will "drop-down" from the menu title exposing menu items that represent the commands available to the user. Of course, the Menu Bar and the available commands can change depending on the context in which the user pulls down the menu.

Figure 4A:
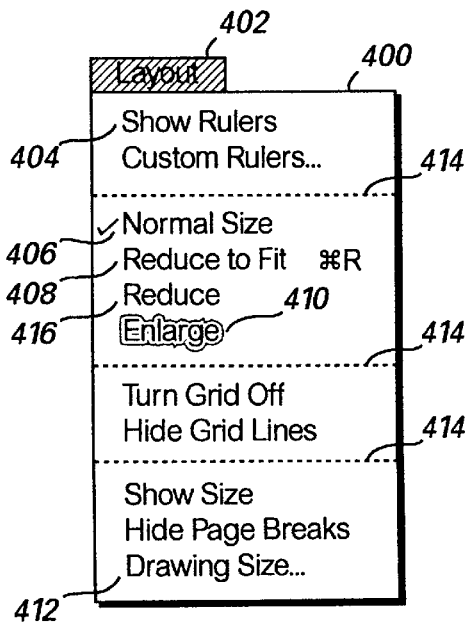
FIG. 4a is a pictorial representation of a typical menu as it is displayed to the user in an exemplary embodiment of the present invention.

FIG. 4a illustrates an example of a typical drop-down menu 400 that has been selected by the user and displayed on the monitor. The drop-down menu 400 descends from the menu title 402, which is stationed on the Menu Bar. The menu items (404, 406, 408, 410, 412, 414, 416) are those elements which fill the area defined by the perimeter of the drop-down menu 400. Usually, the menu items are text elements that are used to represent commands, but menu items can also be graphic elements, such as a dividing line 414 used to organize the other menu items into groups.

Each menu item can be associated with a command. When the user selects such a menu item, the application program 36 (FIG. 1) is instructed that the user has issued the corresponding command. Each menu item can also be associated with attributes that affect the way that the menu item is displayed in the drop-down menu 400. The most commonly applied attribute is the text string that is associated with most menu items. The text string is merely the label that represents the corresponding command to the user. For example, for the Show Rulers menu item 404 the associated text string "Show Rulers" is the menu text attribute. Other indicia may be added as part of the text string to communicate other features to the user. For example, an ellipsis can be included in the text string to indicate that a dialog box will be brought up to elicit further information from the user. This example is illustrated in the case of the Drawing Size menu item 412. A similar addition can be made for a keyboard equivalent, which is a key sequence that the user can enter to issue the command corresponding to the menu item. This is illustrated in the case of the Reduce To Fit menu item 408.

Another common attribute is the enabled attribute. For example, the Enlarge menu item 410 has been disabled, meaning that the command associated with the menu item is not available at the time that the user selected the drop-down menu 400. An enabled attribute is set by the application program 36 (FIG. 1) or some other program module to make this indication to the user. Thus, the menu item has a dimmed appearance to indicate to the user that the corresponding command is unavailable.

Still another common attribute for menu items is the checked attribute. For example, the Normal Size menu item 406 has been marked with a checkmark. Normally, the checkmark is used to indicate the status of a particular property of the application program 36 (FIG. 1). In the example of FIG. 4a, the checkmark indicates that the Normal Size menu item 406 is selected instead of any of the other menu items in the menu item grouping: the Reduce To Fit menu item 408, the Reduce menu item 416, and the Enlarge menu item 410. The checkmark could also be used to indicate whether a particular function of the application program 36 (FIG. 1) is invoked. For example, a checkmark next to the Show Rulers menu item 404, may indicate that rulers are displayed on the monitor, while the absence of the checkmark may indicate that the rulers are not displayed.

Yet another attribute commonly applied to menu items is the visible attribute. The visible attribute determines whether the menu item is displayed as a part of the drop-down menu 400 at all. A menu item with a positive visible attribute is visible when the drop-down menu 400 is displayed, while a menu item with a negative visible attribute is not visible when the drop-down menu 400 is displayed. Of course, all of the menu items depicted in FIG. 4a are visible, but there may be many more menu items (and corresponding commands) associated with the Layout menu title 402, that are not displayed in the drop-down menu 400, because they have a negative visible attribute.

While the enabled, checked, and visible attributes have been provided as examples of menu item attributes, those skilled in the art will recognize that any number of attributes could be applied to menu items. These attributes are only discussed as common examples for the purpose of laying a foundation for a thorough understanding of the present invention.

Before a drop-down menu 400 can be displayed on the monitor, it must be built. That is, a menu title 402 listed in the Menu Bar must be associated with a drop-down menu 400 and all of the commands and attributes corresponding to the constituent menu items must be associated with the appropriate menu items. In the context of this discussion, the process of associating commands and attributes to menu items and menu items to menus is referred to as menu building.

Figure 4B:
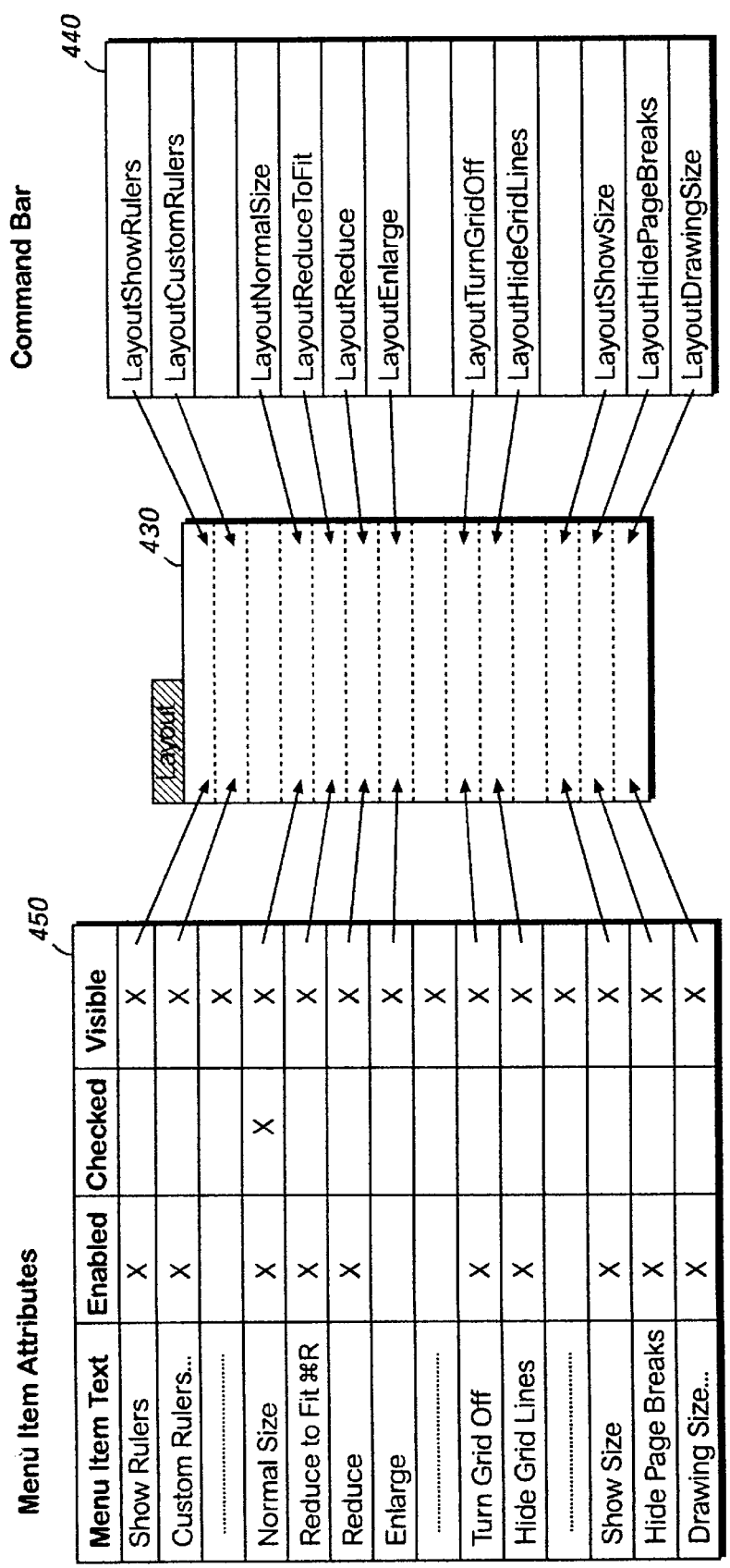
FIG. 4b is a pictorial representation of the menu of 4a, broken down into its constituent parts, as the menu is built in an embodiment of the present invention.

Referring now to FIG. 4b, the drop-down menu 400 is broken down into its constituent parts, so that the menu building process can be described in more detail. One of the basic components of a drop-down menu 400 is the placeholder menu 430, also known as the unbuilt menu. The placeholder menu 430 provides a kind of "clean slate" onto which the drop-down menu 400 can be built. The Command Bar 440 is a list of commands that correspond to positions on the placeholder menu 430. The Menu Item Attributes list 450 includes all of the attributes corresponding to positions on the placeholder menu 430.

The placeholder menu 430 provides a basic data structure for each menu. The placeholder menu 430 provides a position for all of the menu items associated with a particular drop-down menu 400. However, the placeholder menu is extremely flexible in that it does not have a specified number of menu item positions, but rather, can accommodate all of the positions needed to locate all of the commands and menu item attributes associated with a particular drop-down menu. The placeholder menu 430 provides the framework onto which the menu items can be added by assigning menu item attributes (from the appropriate Menu Item Attributes list 450) and assigning commands (from the appropriate Command Bar 440) to positions on the placeholder menu 430. Advantageously, the indefinite structure of the placeholder menu 430 permits the menu building process to commence without having to determine any information about the specifications of the finished drop-down menu 400.

The Command Bar 440 is a data structure for organizing commands that will be issued when certain events take place in the GUI environment. Command bars can be created for menu bars, menus, and toolbars. In the case of a toolbar, a command bar is used to associate a command to a toolbar button, so that the command is issued when the user selects the button with the user interface selection device. In the case of a drop-down menu 400, the Command Bar 440 is used to associate a command with the appropriate menu item, so that the command is issued when the user selects the menu item in a particular location on the drop-down menu 400. Thus, even if the text string associated with a menu item is changed, the same command will be issued when the menu item is selected.

The Menu Item Attributes list 450 contains all of the attributes corresponding to the menu items in the drop-down menu 400. As discussed above in connection with FIG. 4a, a menu item may have an attribute making it not visible. Nonetheless, a placeholder menu position can be allocated and held for the menu item. The placeholder menu 430 position may also have a command associated with it. Thus, the basic data structure of the placeholder menu 430 can exist independently of the status of a particular menu item attribute. A placeholder menu may have significantly more positions than a particular drop-down menu 400 has menu items. The advantage to using a placeholder menu without tying its shape to the commands and/or menu item attributes that will be placed therein, is that it allows the creation of the placeholder menu without retrieving any data about the menu in its built state, saving time and memory resources.

The Command Bar 440, and the Menu Item Attributes list 450 can be stored either as part of the code that makes up the application program 36 (FIG. 1) or in separate menu data files. Similarly, the menu components can be stored together in a combined menu data file or separately in independent menu data files. When stored separately, however, some organizational indicia will usually be required to associate the appropriate command and attribute to a particular placeholder menu position. Those skilled in the art will recognize that many methods exist for coordinating such data structures and data components. One well known method for coordinating such components is to assign identification numbers to each of the components, thereby providing a means for associating the various components with one another.

In general, menu building constitutes the assemblage of the components described above. First, the Menu Bar is created. Second, a placeholder menu 430 is created for each of the menu titles in the Menu Bar. Third, the Command Bar 440 is retrieved from menu data files and commands are assigned to the appropriate placeholder menu 430 positions. Fourth, menu item attributes are retrieved from menu data files and assigned to each of the placeholder menu 430 positions. Fifth, the placeholder menu 430 is converted into a built menu and the built menu is stored as a whole in RAM for subsequent access when the corresponding menu title is selected by the user. Typically, all of the menu building activity takes place in the background (i.e., hidden from the user) and only the built menu is displayed to the user when the user selects a menu title from the Menu Bar.

Those skilled in the art will recognize that each of the steps listed above can be accomplished in a number of ways. As discussed above, the menu data that constitutes the placeholder menus, the Command Bar 440, the Menu Bar, and the menu attributes can be stored in various ways. One well known means by which this menu data can be assembled to create a built menu is by means of the programming routines provided by an application programming interface (API).

An API is a module of code that provides a set of routines that can be called by application programs to perform functions at the operating system level. Conceptually, the API serves as a go-between to the application programs and operating system. The routines contained in the API are standardized, so that different application programs can utilize the same routine calls and parameters to perform common functions. Common APIs contain routines that will construct the entire menu structure (i.e., the Menu Bar, menu titles, and menu items) for an application program. However, most APIs also contain routines that build certain aspects of the menu structure (e.g., retrieving the Command Bar 440 from one or more menu data files), thereby allowing an application program to control the construction of its own menu structure. In the menu building context, an API routine might be responsible for retrieving Menu Bar data from one or more menu data files; creating (drawing) a Menu Bar from that data; retrieving menu data defining individual menus; creating additional menus to add to an existing Menu Bar; or adding new menu items to an existing built menu.

MENU BUILDING DURING IDLE TIME

Figure 5A:
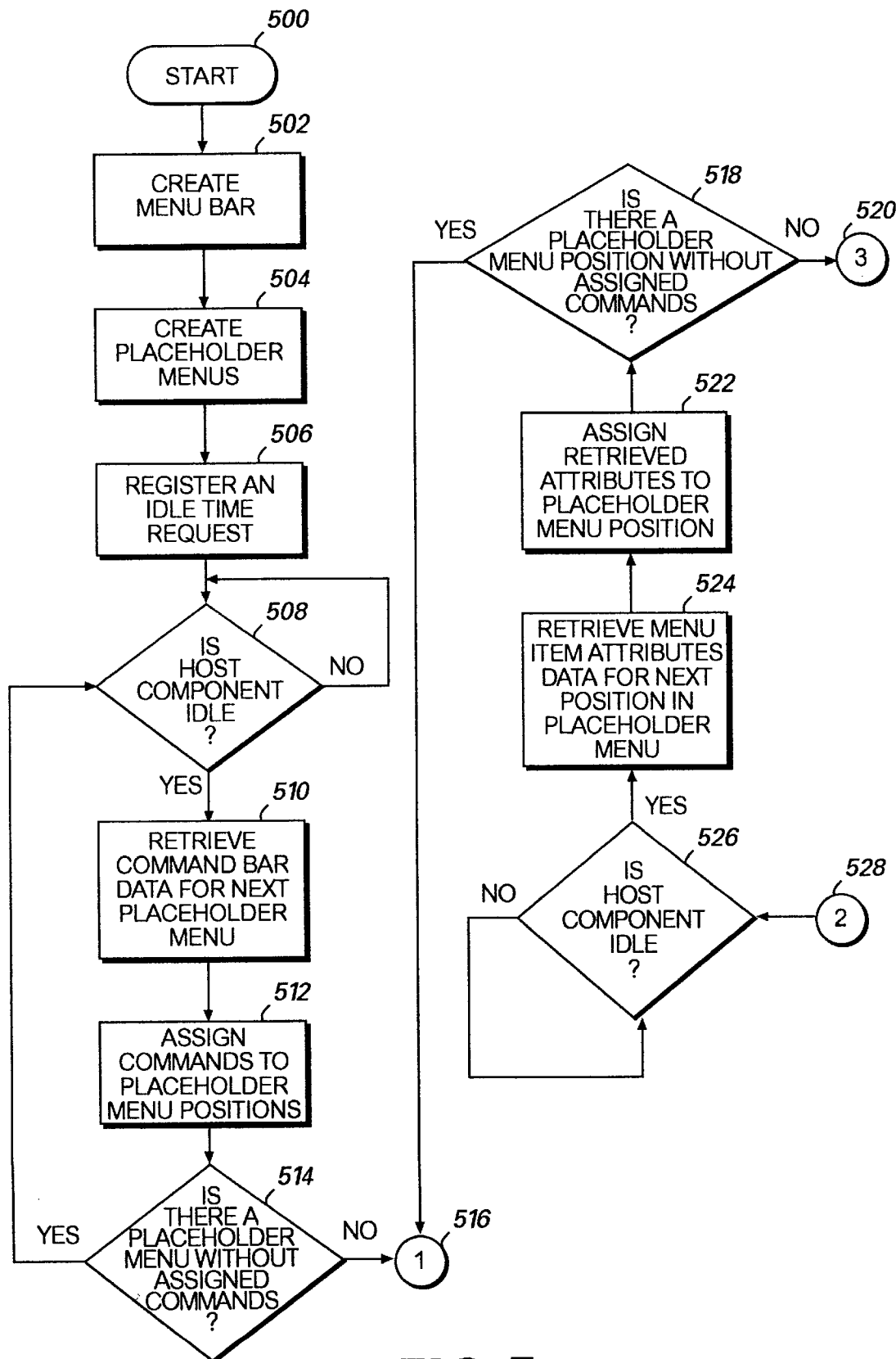
FIGS. 5a, 5b, and 5c are sections of a single flowchart, dissected for clarity, illustrating a method for building a menu structure during idle times.
Figure 5B:
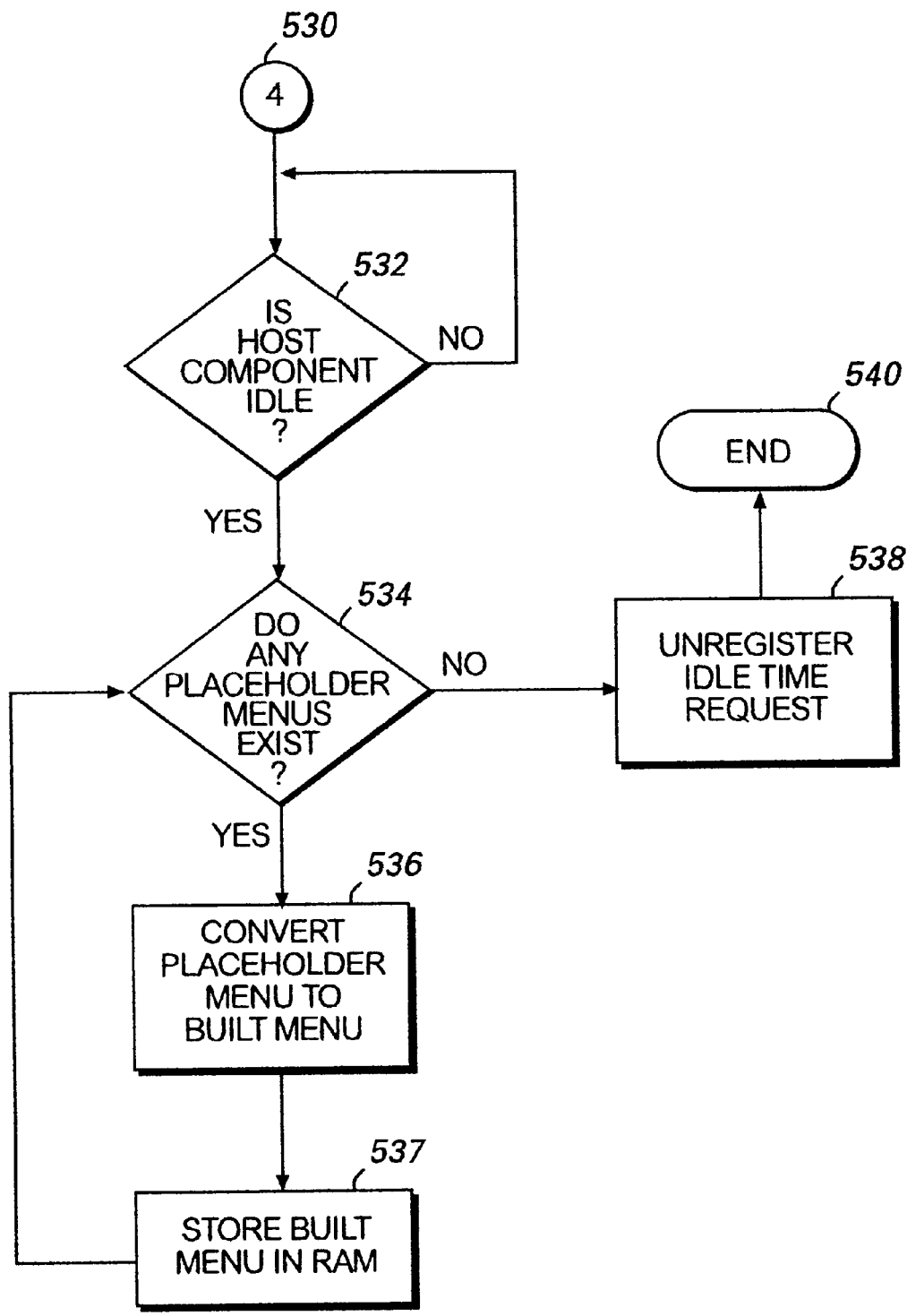
Figure 5C:
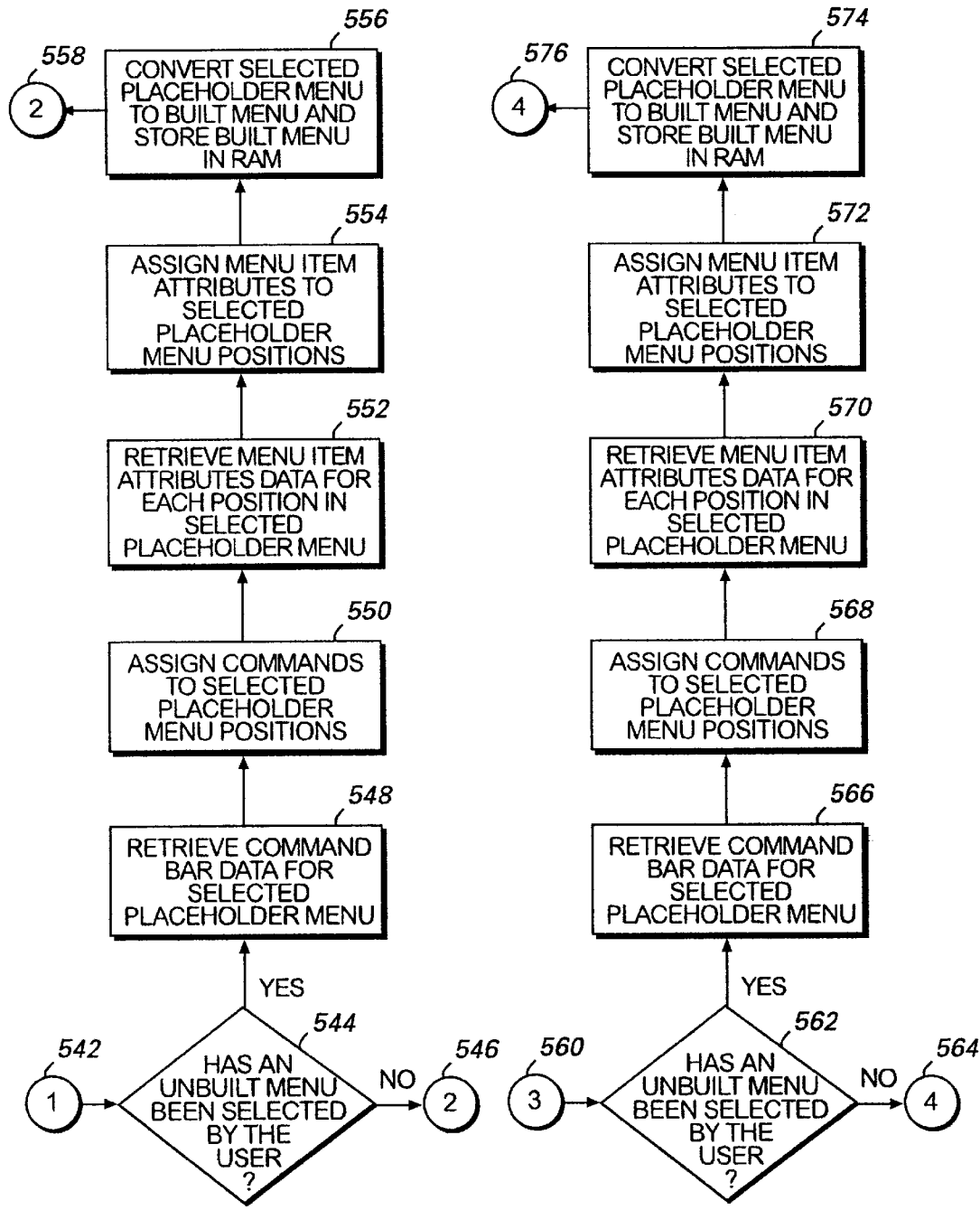

FIGS. 5a, 5b, and 5c depict a flowchart that represents an exemplary method of the present invention. Specifically, the method builds menus by assembling the components discussed in connection with FIGS. 4a and 4b during times that the Host Component 204 is idle. Thus, instead of creating all of the menus at the time the application program 36 (FIG. 1) is started up (booted-up), the menus are created when the Host Component 204 is not making demands on the operating system. Thus, control of the application program 36 (FIG. 1) is made available to the user more quickly after boot than would be the case if all of the menus were built at boot. Unlike other menu building processes, the present method does not build menus upon demand, unless the menu demand occurs before the menu has been built. Thus, the menus will normally be available to the user, upon demand, more quickly than if the menus had to be built first. If a menu demand does occur before a menu is built, the method will build the menu immediately, interrupting other menu building operations.

Referring now to FIGS. 5a, 5b, and 5c, the method begins at START block 500. The method then proceeds to step 502, in which the Menu Bar is created. As discussed in connection with FIGS. 4a and 4b, the Menu Bar is commonly created by use of API routines responsible for retrieving the menu data defining the Menu Bar (e.g., the menu titles) and then drawing the Menu Bar on the monitor. Once the Menu Bar is created, the method proceeds to step 504, in which the placeholder menus 430 are created. However, instead of drawing the placeholder menus 430 on the monitor, the method simply saves the placeholder menus 430 in RAM for further use.

The method then proceeds to step 506, in which the method registers an idle time request, thereby indicating that the method desires an idle time notification. In an exemplary embodiment of the present invention, this will involve registering with the Component Manager 200. In an operating environment in which a Component Manager 200 is utilized to allocate idle time, the method may be embodied in the form of an MBC 37, which registers with the Component Manager, just as any other component that has an idle time requirement.

The method then proceeds to decision block 508, where a determination is made as to whether the Host Component 204 is idle. If the Host Component 204 is not idle, then the process waits until the Host Component 204 is idle, by looping back to decision block 508. Although not shown here, the method can be made more interruptable by incorporating a step in which a determination is made as to whether the user has demanded an unbuilt menu. If the user has not demanded an unbuilt menu, then the method can loop back to decision block 508, but if the user has demanded an unbuilt menu, then the unbuilt menu can be built on-demand, as described below in connection with steps 544–556 and 562–574. If the Host Component 204 is idle, then the method branches to step 510, to retrieve Command Bar data for the next placeholder menu 430. Which placeholder menu 430 is the next placeholder menu 430 can be determined by a predefined order (e.g., left to right) stored along with the other menu data. The first time that this step is performed, the placeholder menu 430 corresponding to the first menu or menu title in the predefined order will be, the next placeholder menu 430. However, the method must progress to the second placeholder menu, the third placeholder menu, and so on, in order to build all of the menus in the menu structure. Therefore, the term "next" is used to indicate that the method utilizes some means of incrementation so that each menu will be built in whatever order has been predefined.

Once the Command Bar 440 data has been retrieved for the particular placeholder menu 430, the commands contained in the Command Bar 440 are assigned to placeholder menu positions in the placeholder menu 430, at step 512. Part of the data that is retrieved in step 510 is the number of placeholder positions that will be utilized by the drop-down menu 400 and to which placeholder menu position each command corresponds. Step 512 assures that the appropriate command will be issued when the user selects a particular menu item from a drop-down menu 400. The method then proceeds to decision block 514, in which a determination is made as to whether a placeholder menu 430 still remains for which the commands have not been assigned. If a placeholder menu 430 still remains without assigned commands, the method branches to decision block 508 and the command assignment process is repeated, during idle times, for all placeholder menus 430. If, on the other hand, no placeholder menus 430 remain for which commands haven't been assigned, the method branches to decision block 544 (via connectors 516 and 542).

Decision block 544 represents the first step in a sub-process that is performed when the user demands a menu that has not yet been built during idle time. This sub-process is encountered in at least two other parts of the method. Because this sub-process is common to at least three areas of the method and because it performs operations that are common to other areas of the method, description of the sub-process is postponed to the end of the description of the method's main process flow.

Picking up the method at decision block 526, a determination is made as to whether the Host Component 204 is idle. If the Host Component 204 is not idle, then the process waits until the Host Component 204 is idle, by looping back to decision block 526. Although not shown here, the method can be made more interruptable by incorporating a step in which a determination is made as to whether the user has demanded an unbuilt menu. If the user has not demanded an unbuilt menu, then the method can loop back to decision block 526, but if the user has demanded an unbuilt menu, then the unbuilt menu can be built on-demand, as described below in connection with steps 544–556 and 562–574. If the Host Component 204 is idle, then the method branches to step 524, to retrieve menu item attribute data for the next placeholder menu position. Once the menu item attribute data has been retrieved, the attributes are assigned to the placeholder menu position at step 522. As with the commands described above, the menu item attributes are associated with a placeholder menu position, such that even if the command is unavailable, or the menu item is not visible, the association between the placeholder menu position and the menu item attributes is maintained. Moreover, as with the placeholder menus, the placeholder menu positions must be traversed in some predefined order so that the assignment of menu attributes is assured for all placeholder menu positions. Accordingly, the term "next" is used here to indicate that a predefined order is maintained through incrementation.

The method then proceeds to step 518, where a determination is made as to whether a placeholder menu position exists for which menu item attributes have not been assigned. If such a placeholder menu position exists, then the method returns to step 544 (via connectors 516 and 542) to determine whether the user has demanded a menu. If there are no more placeholder menu positions for which menu item attributes have not been assigned, then the method branches to step 562 (via connectors 520 and 560) to determine whether the user has demanded a menu. If the user has not demanded a menu, then the method branches to step 532 (via connectors 564 and 530) where a determination is made as to whether the Host Component 204 is idle. If the Host Component 204 is not idle, then the process waits until the Host Component 204 is idle, by looping back to decision block 532. Although not shown here, the method can be made more interruptable by incorporating a step in which a determination is made as to whether the user has demanded an unbuilt menu. If the user has not demanded an unbuilt menu, then the method can loop back to decision block 532, but if the user has demanded an unbuilt menu, then the unbuilt menu can be built on-demand, as described below in connection with steps 544–556 and 562–574. If the Host Component 204 is idle, then the method branches to step 534, where a determination is made as to whether any placeholder menus 430 exist.

Placeholder menus 430 are converted into built menus at step 536. Therefore, decision block 534 is a means of determining whether the menu building process is completed. If any placeholder menus exist, then the menu building process must continue, and the method proceeds to step 534 to convert the next existing placeholder menu to a built menu.

A built menu is simply a menu that is in a format suitable for immediate display on the monitor, in response to the user's selection of the corresponding menu title. Converting the placeholder menu 430 to a built menu is the process of compiling all of the retrieved and assigned menu data into such a format. Because the building process differs depending on the computer system upon which the method is used, the details are omitted from this discussion. Those skilled in the computer programming arts will appreciate that there are a number of well known ways to convert a placeholder menu to a built menu.

Once the menu has been built, it is stored in random access memory (RAM) at step 537 so that it can be easily and quickly accessible to the application program 36 (FIG. 1) and to the API routines that the application program 36 (FIG. 1) may use to display drop-down menus. The method then branches back to step 534 to determine whether any more placeholder menus exist. If no more placeholder menus exist, the method branches to step 538, and the method unregisters the idle time request registered in step 506. Because no more placeholder menus exist, then the menu building process is complete, and no more idle time is needed. The method proceeds to the END block 540.

As an alternative embodiment, the Host Component may be configured to alert the Component Manager as to the existence of an idle state. In such an embodiment, the Component Manager needn't itself make a determination as to whether the Host Component is idle, as this function would be provided by the Host Component. Accordingly, when the Component Manager is said to make a determination that the Host Component is idle (e.g., steps 508, 526, 532), the inventors contemplate this to encompass the embodiment in which the Component does this by receiving an idle alert from the Host Component.

As stated above, the main process flow of the method is interrupted when the user demands an unbuilt menu. The reason for making the process flow interruptable, is that it is undesirable to require the user to wait any longer for a demanded menu to be displayed than the amount of time necessary to build that particular menu. Therefore, when the user demands the unbuilt menu, the method builds that menu immediately, so that the menu is accessible by the application program 36 (FIG. 1) and/or API routine for display on the monitor. The method checks for a demanded menu at three junctures: first after step 514, at which point all commands have been assigned; then after step 518, in the case in which the method is about to assign menu item attributes to the next placeholder menu position; and finally, after step 518, in the case where all of the placeholder menu positions have all been assigned menu item attributes. Additionally, the method may be made more interruptable (i.e., responsive to the user) by checking for a demanded menu upon following the "NO" branch of decision blocks 508, 526, and 532. These junctures are accommodated by two demanded menu building sub-processes. However, because the two sub-process are identical, steps 544–556 and 563–574 will be discussed concurrently (corresponding steps are indicated in parentheses).

Starting at step 544 (562), a determination is made as to whether the user has demanded an unbuilt menu. If an unbuilt menu has been demanded, the method branches to step 548 (566), in which the command bar data for the selected placeholder menu is retrieved (the placeholder menus are all available at this point in the method). The method then proceeds to step 550 (568) and assigns commands to the selected placeholder menu positions. The method then proceeds to step 552 (570), where the menu item attributes are retrieved for each placeholder menu position in the selected placeholder menu. The method proceeds to step 554 (572) in which the menu item attributes are assigned to the placeholder menu positions. Finally, the method proceeds to step 556 (574), where the placeholder menu is converted to a built menu. This is the last step in the subprocess, and the method returns to the main process, at the point at which it left-off (via connectors 558, 528, 576, 530).

REVIEW OF THE DETAILED DESCRIPTION

From the foregoing description, it will be appreciated that the present invention provides an improved method for building menus during idle times. Depending on the operating environment in which the present invention is implemented, an exemplary embodiment may be implemented as a Menu Building Component, which is responsive to idle time notifications generated by a Component Manager. Alternatively, an exemplary embodiment may be implemented as a program module that stands alone or is integrated into an application program. The method builds predetermined aspects of the menu structure during idle times. Thus, the menu building process, as performed by the improved method of the present invention, minimizes the use of computer resources during times that these resources are being demanded by other components and/or application programs.

The present invention has been described in various exemplary embodiments, and particularly as an integrated component of an application program. However, those skilled in the computer arts will appreciate that the invention is not limited to the described embodiments, but can be implemented in various embodiments including stand-alone program modules. Alternative embodiments will become apparent to those skilled in the art to which the present invention pertains without departing from its spirit and scope. Accordingly, the scope of the present invention is defined by the appended claims rather than the foregoing description.

What is claimed is:

1. In a computer system having a graphical user interface including a display device and a user interface selection device, a method for building a menu structure having a Menu Bar, at least one menu title, and at least one menu, for subsequent display on the display device, the method comprising the steps of:

building the Menu Bar;

in response to the Menu Bar having been built, making a determination as to whether the Menu Bar contains at least one menu title corresponding to an unbuilt menu;

in response to the Menu Bar containing at least one menu title corresponding to the unbuilt menu, receiving an idle time notification; and in response to receiving the idle time notification, building the unbuilt menu.

2. The method of claim 1, wherein the step of receiving the idle time notification comprises the steps of:

registering an idle time request with a Component Manager;

causing the Component Manager to make a determination as to whether an idle state exists; and in response to a determination that an idle state exists, receiving an idle time notification from the Component Manager.

3. The method of claim 2, further comprising the step of:

in response to a determination that the Menu Bar does not contain a menu title corresponding to an unbuilt menu, unregistering with the Component Manager.

4. The method of claim 1, further comprising the step of:

in response to a determination that the user interface selection device has selected the menu title corresponding to an unbuilt menu, building the unbuilt menu.

5. The method of claim 1, wherein the Menu Bar contains a left-most menu title and a right-most menu title, and wherein the building the unbuilt menu step comprises the steps of:

determining whether the left-most menu title corresponds to an unbuilt menu;

in response to a determination that the left-most menu title corresponds to an unbuilt menu, building the unbuilt menu corresponding to the left-most menu title;

determining which menu title corresponding to an unbuilt menu is closest to the left-most menu title; and building the unbuilt menu corresponding to the menu title closest to the left-most menu title.

6. The method of claim 1, wherein the Menu Bar contains a left-most menu title and a right-most menu title, and wherein the method further comprises the step of building the unbuilt menus in a predetermined order.

7. The method of claim 1, wherein the step of building the unbuilt menu comprises the steps of:

converting the unbuilt menu into a built menu; and storing the built menu in a random access memory (RAM) for subsequent retrieval.

8. The method of claim 7, wherein the step of converting the unbuilt menu into the built menu comprises the steps of:

accessing at least one menu data file corresponding to the menu title;

retrieving menu data from the at least one menu data file;

building a menu in accordance with the menu data, such that the menu is in a format suitable for display on the display device.

9. The method of claim 8, wherein the built menu comprises at least one menu item and wherein the menu data includes a command corresponding to each menu item.

10. The method of claim 9, wherein the at least one menu data file can be modified, and whereby a display position of each menu item can be determined according to user input.

11. The method of claim 8, wherein the built menu comprises at least one menu item, each menu item being defined by at least one menu item attribute selected from the group consisting of:

a text string of the menu item;

an enabled state of the menu item;

a checked state of the menu item;

a keyboard equivalent of the menu item;

an icon of the menu item; and a text format of the menu item.

12. The method of claim 11, wherein the at least one menu data file can be modified, whereby the menu item attributes that define each menu item can be determined according to user input.

13. The method of claim 8, further comprising the step of:

in response to a determination that the user interface selection device has selected the menu title corresponding to the built menu, recalling the built menu from the RAM and displaying the built menu on the display device.

14. In an application program having a menu structure including a Menu Bar, at least one menu title, and at least one menu, wherein a command is issued by selecting one of the menu titles and selecting a menu item associated with the command from a menu corresponding to the selected menu title, a method for building the menu structure, the method comprising the steps of:

in response to a start-up of the application program, building the Menu Bar;

in response to the Menu Bar being completely built, determining whether each menu title contained in the Menu Bar has a corresponding built menu;

in response to the determination that at least one of the menu titles does not have a corresponding built menu, registering an idle time request with a Component Manager;

causing the Component Manager to make a determination that the application program is in an idle state;

in response to the application program being in an idle state, receiving an idle time notification from the Component Manager;

in response to receiving the idle time notification from the Component Manager, creating a built menu; and in response to a determination that each menu for at least one of the menu titles that does not have a corresponding built menu title contained in the Menu Bar has a corresponding built menu, unregistering with the Component Manager.

15. The method of claim 14, further comprising the step of:

in response to creating the built menu, storing the built menu in a random access memory (RAM).

16. The method of claim 14, further comprising the step of:

in response to a determination that the user interface selection device has selected a menu title not having a corresponding built menu, creating a built menu corresponding to the menu title.

17. The method of claim 14, wherein the step of creating the built menu comprises the steps of:

accessing at least one menu data file corresponding to the menu title;

retrieving menu data from the at least one menu data file;

building a placeholder menu;

assigning commands to positions on the placeholder menu;

assigning menu item attributes to the positions on the placeholder menu; and converting the placeholder menu to a built menu.

18. The method of claim 17, wherein the built menu comprises at least one menu item and wherein the menu data includes the display position in which each menu item will be displayed on the display device.

19. The method of claim 17, wherein the built menu comprises at least one menu item, each menu item being defined by at least one menu item attribute selected from the group consisting of:

a text string of the menu item;

an enabled state of the menu item;

a checked state of the menu item;

a keyboard equivalent of the menu item;

an icon of the menu item; and a text format of the menu item.

20. A computer-readable medium having computer-executable instructions for performing steps comprising:

(a) building a Menu Bar, (b) making a determination that an idle state exists;

(c) in response to the determination that the idle state exists, building a menu.

21. The computer-readable medium of claim 20 having further computer-executable instructions for performing the step of:

(d) storing the menu in a random access memory (RAM) for subsequent retrieval and display on a display device.

22. The computer-readable medium of claim 20, wherein the Menu Bar consists of at least one menu title and wherein steps (b) and (c) are repeated as many times as is necessary to build a menu to correspond to each menu title.

23. The computer-readable medium of claim 20, wherein step (b) comprises the steps of:

i) determining whether an application program is idle;

ii) in response to a determination that the application program is idle, transmitting an idle time notification;

iii) receiving the idle time notification; and iv) in response to the receipt of the idle time notification, building the menu.

24. The computer-readable medium of claim 20, wherein the menu comprises at least one menu item, and each menu item is defined according to the contents of at least one menu data file.

25. The computer-readable medium of claim 24, wherein the contents of the at least one menu data file include at least one menu item attribute selected from the group consisting of:

a text string of the menu item;

an enabled state of the menu item;

a checked state of the menu item;

a keyboard equivalent of the menu item;

a display position of the menu item;

an icon of the menu item; and a text format of the menu item.

* * * * *